J. C. ANDERSON.
Process and Apparatus for Manufacturing Brick and other Articles from Calcareous Clay.

No. 214,481. Patented April 22, 1879.

Witnesses
Ernst Jebsen
E. H. Frommann

Inventor.
J. C. Anderson

UNITED STATES PATENT OFFICE.

JAMES C. ANDERSON, OF PITTSBURG, PENNSYLVANIA.

IMPROVEMENT IN THE PROCESSES AND APPARATUS FOR MANUFACTURING BRICK AND OTHER ARTICLES FROM CALCAREOUS CLAY.

Specification forming part of Letters Patent No. 214,481, dated April 22, 1879; application filed September 16, 1878.

*To all whom it may concern:*

Be it known that I, JAMES C. ANDERSON, of the city of Pittsburg, Allegheny county, and State of Pennsylvania, have invented a new and useful Improvement in the Processes and Apparatus for Manufacturing Brick and other Articles from Calcareous Clay, which improvement is fully set forth in the following specification, reference being had to the accompanying drawings.

The invention relates to the manufacturing of brick from calcareous clays. Such clays heretofore were molded into brick direct from the clay beds in the natural state, or when mixed with water into a mortar-like paste, without the elimination of the calx-pebble impurities or freeing the water from the interstices and pores of the clay. These clays abound in many parts of the country, (and particularly in the clay beds underlying the city of Chicago, and adjacent thereto,) in which clay beds lime pebbles exist in such large numbers as to cause notoriously great waste and loss by the slaking of the lime after they are burned, bursting many of the bricks, rendering them totally worthless, and so shattering the others as to mar their appearance and damage their utility in the walls of a building, the said city being dependent for clays for bricks, tiles, and other articles of pottery from these beds, or to transport them long distances and at great expense.

The invention consists in first drying the clay, and then subjecting the mass to concussion and attrition of the parts in motion within a rotating cylindrical shell provided with a system of screens and suitable mechanism, hereinafter described, by which operation the atoms of the clay are disintegrated and separated into a fine powder, and at the same time intermixed and tempered into a homogeneous mass, and the pebbles incorporated with the clay are disincorporated in the operation without being crushed or ground, but preserved intact and separated from the clay powder by the operation of the screens. The clay powder, when so separated and in the dry state, is taken up by suitable machinery and molded into brick form, and the bricks so produced are of exceedingly solid and firm texture, of great durability and fineness of finish, free from the pitting-out unsightly blotches heretofore incident to these clays, and obviating the difficulties heretofore experienced, as above stated, and thus utilizing these clays in a new and useful product.

Figure 1:
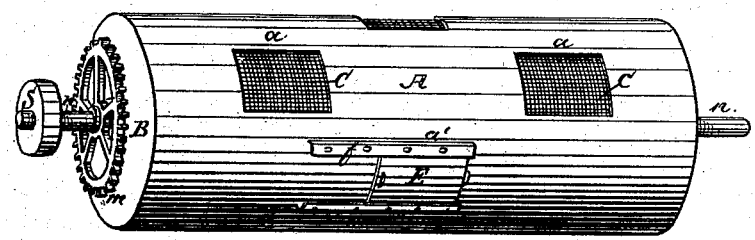
Figure 2:
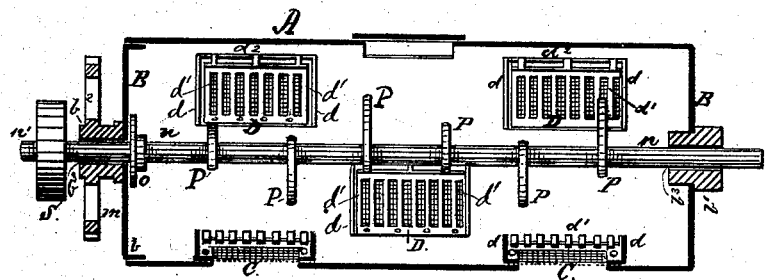
Figure 3:
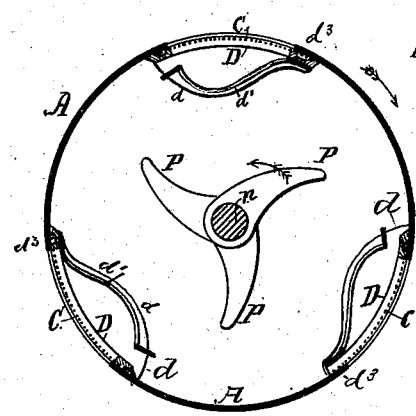

In the accompanying drawings, Figure 1 shows a view of the screen, cylindrical shell, and mechanism as detached from the frame-work. Fig. 2 shows a longitudinal central view, and Fig. 3 shows a cross-sectional view, of the same.

The sides of the main shell A are made of heavy sheets of boiler-iron, riveted together at the joints and to the trunnion-heads B through the flanges $b$. The heads B are made of cast-iron, forming in one piece the flange $b$ and hollow trunnions $b^1$ $b^2$. Openings are made in the main shell at $a$ $a$, over which are secured the screens C C and D D. An opening is also made in the main shell $a'$, over which the door E is made to close and open, as desired, by means of the slides $f$. The screens D D are made of cast-iron, and formed so as to fit up snug to the main shell on the inner side thereof, and to be secured thereto by means of screw-bolts through the shell and the flanges $d$ $d$. The bars $d^1$ $d^1$ of the screens are placed about one-half inch apart, and stand off from the flanges $d$ at the one side of the screens, forming the spaces $d^2$, and to descend to and connect with the flange $d$ at the other side of the screen in the direction of the arrow-point. Grooves $d^3$ are formed on the sides of the screen-castings that join to the main shell, into which grooves are fitted iron rods for securing the screens C C in place. The screens C C are made of fine wire-cloth of about twenty meshes to the inch. A gear-wheel, $m$, is secured to the trunnion $b^2$, which trunnion is made of suitable length for that purpose.

Suitable openings, $b^3$, are made through the center of the trunnions, for allowing the beater-shaft $n$ to pass through, and to work freely upon suitable bearings at $n'$ $n'$. Collars $o$ are set-screwed to the shaft $n$ on the inner side of the trunnion-heads, and are made to fit up snug thereto, to prevent lateral motion of the shaft and leakage of the clay around the shaft at the openings $b^3$. Secured to the shaft $n$ rigidly are the beater-arms P P, which are made to encircle, when in motion, about two-thirds the diameter of the cylindrical shell A, and may be placed at any desirable distance apart, but should be placed as close as possible to insure the speedy reduction of the clay. Secured also to the shaft $n$ are the pulleys S, for driving the shaft $n$.

In the operation the clay to be reduced, when dry, is charged into the cylindrical shell through the opening $a'$ and the door E closed. The shell A is then, by a suitable gearing connecting with the gear-wheel $m$, made to rotate in the direction of the arrow-point. Simultaneously therewith, the shaft $n$ is made to rotate in an opposite direction thereto. The speed of the main shell A should be so timed with relation to the diameter thereof as to allow the clay to be carried well up the sides of the shell, and then to fall upon the beater-arms P of the shaft $n$. The shaft $n$ should be set in rapid motion, making at least seven revolutions to one of the shell A. By this operation the clay within the shell A is brought in rapid and repeated contact with the beater-arms and the shell, the concussion of which and the attrition of the parts serve to separate the clay, atom from atom, without crushing or breaking up the lime pebbles or other impurities in the form of pebbles in the clay, and by the same operation the interstratified mineral washes in the clay will be broken up and disseminated throughout the whole body, and the clay thoroughly tempered into a homogeneous mass. Throughout this operation, in the downward motion of the screens, the finer parts of the clay, as reduced, are made to pass through the bars of the screens D, allowing the powered parts thereof to pass through the fine screens C, and in the upward motion of the screens the clay thus partly reduced remaining between the screens is discharged through the space $d^2$ into the shell for further reduction.

It will be seen that by the peculiar construction of the metal screens D, which intervene between the main body of the clay within the shell and the finer screens C, which must of necessity be of frail construction, a complete protection is afforded the screen C from being speedily dashed to pieces by the violent motion of so large a body of clay, and at the same time affording the free operation of the finer screens for screening the clay into a fine powder.

Having thus described my invention, what I claim is—

1. In the manufacture of bricks from calcareous clay, the process herein described of freeing said clay from calx pebble, &c., disincorporating and screening the pebbles from clay, and intermixing the atoms of the clay, when dry, by attrition into a fine homogeneous powder, substantially in the manner and by the means shown and described.

2. In combination with the outer cylinder or shell, A, provided with screens C, protected by the bars $d^1$, the central shaft, $n$, provided with beater-arms P, when constructed to operate substantially in the manner and for the purpose set forth.

J. C. ANDERSON.

Witnesses:
T. T. BROWN,
D. B. BROOKS.